Figure 1:
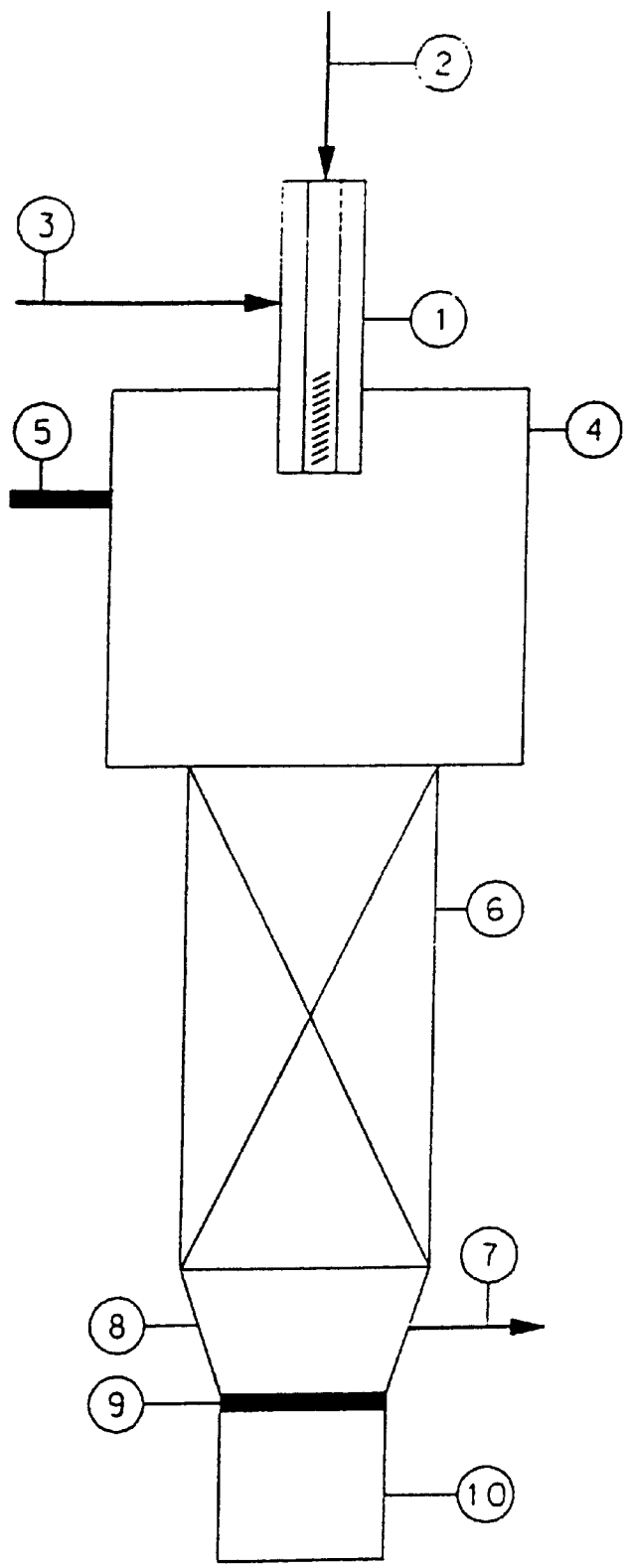

United States Patent [19]
Daire et al.

[11] Patent Number: 6,036,936
[45] Date of Patent: Mar. 14, 2000

[54] PROCESS FOR THE PRODUCTION OF HYDROGEN BROMIDE GAS AND DEVICE FOR ITS IMPLEMENTATION

[75] Inventors: Sylvie Daire, Chateauncuf-Les-Martigues; Gilles Drivon, Saint-Martin-en-Haut; Thierry Nodari, Nancy; Michel Leydecker, Pagny-Sur-Moselle, all of France

[73] Assignee: Elf Atochem, S.A., Puteaux, France

[21] Appl. No.: 08/885,866

[22] Filed: Jun. 30, 1997

[30] Foreign Application Priority Data

Jun. 28, 1996 [FR] France .................................. 96 08116

[51] Int. Cl.⁷ ..................................................... C01B 7/09
[52] U.S. Cl. ............................................. 423/487; 423/486
[58] Field of Search .................... 423/487, 481, 423/486

[56] References Cited

U.S. PATENT DOCUMENTS

| | | | |
|---|---|---|---|
| 1,380,084 | 5/1921 | Tschudi ..................................... | 423/487 |
| 1,905,432 | 4/1933 | Bauer ........................................ | 423/487 |
| 2,070,263 | 2/1937 | Dressel et al. ........................... | 423/487 |
| 2,366,670 | 2/1945 | Maude ...................................... | 423/487 |
| 3,119,669 | 1/1964 | Laird, Jr. et al. ........................ | 423/487 |
| 3,925,540 | 12/1975 | Hatherly ................................... | 423/478 |
| 3,988,427 | 10/1976 | Bossler, III et al. .................... | 423/487 |
| 3,998,926 | 12/1976 | Oliver et al. ............................. | 423/22 |
| 4,960,378 | 10/1990 | Jannemann et al. .................... | 431/114 |

FOREIGN PATENT DOCUMENTS

| | | | |
|---|---|---|---|
| 614628 | 2/1961 | Canada ..................................... | 423/487 |
| 0 497 712 | 8/1992 | European Pat. Off. ............... | 423/487 |
| 2 365 516 | 4/1978 | France . | |
| 428225 | 1/1923 | Germany . | |
| 76670 | 12/1970 | Germany ................................ | 423/487 |
| 27 38 744 | 3/1979 | Germany . | |
| 173300 | 12/1921 | United Kingdom ................... | 423/487 |

OTHER PUBLICATIONS

Translation of DE 428,225, Apr. 1926.
Translation of DE 2,738,744, Mar. 1979.

*Primary Examiner*—Ngoc-Yen Nguyen
*Attorney, Agent, or Firm*—Millen, White, Zelano & Branigan, P.C.

[57] ABSTRACT

A process for the production of hydrogen bromide gas by direct combustion of bromine in hydrogen involves carrying out the combustion reaction in an apparatus chamber made of impregnated graphite and a cooling zone composed of a steel jacket in which are piled blocks of impregnated graphite.

19 Claims, 3 Drawing Sheets

PROCESS FOR THE PRODUCTION OF HYDROGEN BROMIDE GAS AND DEVICE FOR ITS IMPLEMENTATION

FIELD OF THE INVENTION

The invention relates to a process for the production of pure hydrogen bromide by direct combustion of bromine in hydrogen.

The invention also relates to a device for carrying out the process.

BACKGROUND OF THE INVENTION

U.S. Pat. No. 2,070,263 describes a method for obtaining aqueous solutions of hydrobromic acid which consists, in a first step, in passing hydrogen through liquid bromine maintained at a temperature of between 37° C. and 42° C. in order to form a mixture of bromine and hydrogen gas which is burnt at a temperature of between 600° C. and 850° C. By working in this way, it is difficult to have an intimate mixture of bromine and hydrogen in stoichiometric amounts on account of the difficulties in rigorously maintaining the temperatures and the thermodynamic equilibria.

An instability of the combustion flame has also been observed, in devices based on the direct combustion of bromine in hydrogen according to an $H_2/Br_2$ molar ratio of greater than 1, and for which no technique for mixing the reactants is mentioned, this instability being manifested in particular by strong vacillation of the flame at the burner outlet, going as far as a detachment of the flame ("blow off") from the said burner, which may entail a risk of explosion and a fluctuating quality of the hydrogen bromide gas produced.

Furthermore, such flames become extended forming cones at the base of which are regions from which the reactants are liable to escape without being burnt.

This disrupts the combustion of the bromine in the hydrogen and results especially in residual bromine in the combustion gases, this being of a nature to bring about a considerable decrease in the lifetime of the burners, limit the range of materials which may be used and degrade the quality of the hydrogen bromide gas, thereby preventing it from being used as a reactant for downstream syntheses (secondary reactions, colorations of the products) or for the preparation of hydrobromic acid solutions.

Patent FR 2,365,516 proposes a process which improves the stability of the flame resulting from the combustion of bromine in hydrogen by establishing a helical stream of bromine in a cylindrical chamber, then injecting the hydrogen radially towards the outside in the helical stream of bromine and continuously supplying a flame close to the chamber with the helical stream of bromine and hydrogen.

This process, using a molar excess of hydrogen of 2.6%, leads to an HBr gas containing 300 ppm of bromine by volume, which still gives rise to colorations of the downstream synthesis products as well as the drawbacks mentioned above.

In addition, the complexity of the burner entails a lack of flexibility. Thus, in particular, when it is desired to increase the capacity of the said device, several burners are arranged side-by-side in the same chamber. In such an arrangement, it cannot be avoided that the flames from different burners mounted in parallel will interfere with each other, and furthermore this arrangement is unacceptable with regard to obtaining good distribution of the reactants. This configuration inevitably leads to a lowering in the degree of conversion of the bromine, complicates the control of the cooling of the HBr formed and increases the risks of explosion.

SUMMARY OF THE INVENTION

A process has now been found for the preparation of pure hydrogen bromide gas by direct combustion of bromine in hydrogen according to the reaction $H_2+Br_2 \rightarrow 2HBr$, characterized in that it consists in carrying out the following steps successively:

intimately mixing hydrogen and an oxidant in a chamber under a pressure greater than or equal to atmospheric pressure, starting a flame at the outlet of the said chamber, replacing all or part of the oxidant by a stream of prevapourized bromine, in an $H_2/Br_2$ molar ratio which is sufficient to maintain a stable flame at the outlet of the said chamber and in a so-called combustion zone, thereby making it possible to obtain complete combustion of the bromine in the hydrogen, cooling the combustion gases in a cooling zone, then recovering a flow of hydrogen bromide gas under a pressure at least equal to 1 bar absolute and preferably under a pressure of between 1.3 bar absolute and 10 bar-absolute and at a temperature not above 125° C. and preferably between 40° C. and 125° C.

According to the present invention, any mixture consisting of a gas which is inert towards the reactants of the reaction for the formation of HBr and an amount of oxygen which is sufficient to lead to a combustible mixture with hydrogen may be used as oxidant. Nitrogen may be used as inert gas. The oxidant is preferably air.

According to the present invention, the oxidant may be partially or totally replaced. In the case where a certain amount of oxidant is maintained, this amount may vary within a wide range which depends in particular on the organic impurities present in the supply stream of bromine gas, the size characteristics of the apparatus and the use downstream of the HBr produced.

Hydrogen and the oxidant are introduced in gaseous form into the chamber at room temperature. When the flame is started, the oxidant is replaced by bromine gas introduced at a temperature slightly above its boiling point.

The pressure in the chamber is at least equal to 1 bar absolute, preferably greater than 1.3 bar absolute and even more preferably between 1.8 bar absolute and 10 bar absolute.

It would not constitute a departure from the invention if the pressure was slightly below atmospheric pressure.

The $H_2/Br_2$ molar ratio is greater than 1. Preferably, the $H_2/Br_2$ molar ratio is greater than 1 and less than 1.4. The Applicant has observed that, under the reaction conditions of the present invention, the bromine is consumed instantaneously and almost completely.

The reaction of bromine and hydrogen is accompanied by a release of heat (12.3 kcalories per mole of HBr gas formed) which raises the temperature of the combustion flame to more than 1600° C. under adiabatic conditions.

According to the present invention, the cooling of the hydrogen bromide formed starts from the moment of its formation in the combustion zone and then continues in a cooling zone designed such that the temperature falls gradually in these zones and, at the outlet of the cooling zone, is between 40° C. and 125° C. in the region of 60° C. The pressure prevailing in the said cooling zone is at least equal to 1 bar absolute and is preferably between 1.3 bar absolute and 10 bar absolute.

This process may be carried out using a device as represented diagrammatically in FIG. 1.

This device successively comprises:
- a burner (1) comprising means (2) for introducing the bromine and/or the oxidant, means (3) for introducing the hydrogen and means for placing the said reactants in contact,
- a combustion chamber (4),
- means (5) for starting a flame,
- means (6) for cooling the combustion gases (HBr),
- means (7 and 8) for evacuating the combustion gases (HBr), and
- safety members (9) and (10).

Figure 2:
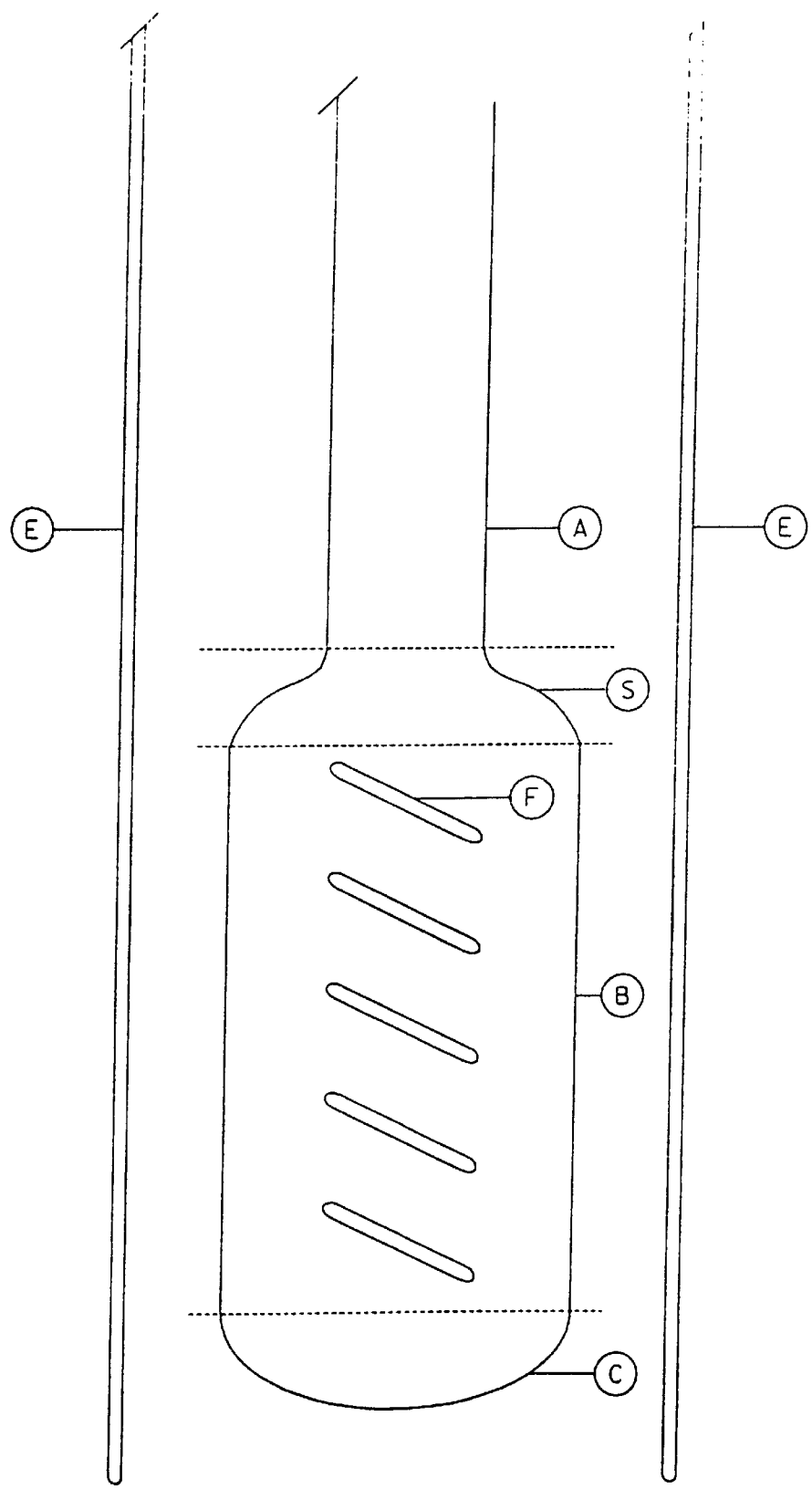

According to the present invention, the burner (1) consists of a vertical chamber (E) inside which is placed a vertical cylindrical tube, as represented in FIG. 2, consisting of:
- an open cylindrical upper part (A) of length L1 and of diameter D1,
- a cylindrical lower part (B) of length L2 and of diameter D2, with D2>D1, this lower part (B) being terminated with a spherical cap (C). Part (B) is provided with orifices (F) that are preferably inclined.

Parts (A) and (B) are joined by a spherical segment (S).

The values L1, L2, D1 and D2 and the number of orifices (F) determine the flexibility of the device. A person skilled in the art will adapt these values to the required capacity and to the exploitation constraints of the plant.

According to the present invention, the bromine and/or the oxidant are introduced via (2) directly into the vertical tube at the upper part of the cylindrical part (A) and the hydrogen is introduced via (3), preferably perpendicular to the vertical tube and inside the volume consisting of the chamber (E) and the said vertical tube.

The chamber and the vertical tube may consist of refractory materials such as silica or quartz or of a metal having a resistance which is suited to the quality of the reactants, such as nickel.

According to the present invention, the base of the burner emerges in the combustion chamber (4), which is advantageously cooled.

This combustion chamber is fitted with means (5) for starting the flame. The flame may be started by a lighting member which provides the energy required for lighting up. This may be a small auxiliary burner, via an inspection port (not represented in FIG. 1).

This combustion chamber may consist of graphite impregnated with phenolic resins or fluoro polymers with an outer steel jacket in which a cooling fluid circulates.

According to the present invention, the impregnated graphite should have thermal, mechanical and chemical resistance characteristics that are suited to the process.

By way of illustration of such an impregnated graphite which may be used according to the present invention, mention will be made of Graphylor® HB, TH and GH which are marketed by the company Carbone Lorraine.

The cooling zone (6) according to the present invention consists of a steel jacket in which are piled blocks of impregnated graphite.

According to the present invention, these blocks consist of axial channels in which the combustion gases circulate, and radial channels in which water or a cold brine circulates.

According to the present invention, the number of blocks to be used may vary within a wide range. It is calculated such that the temperature of the combustion gases arriving into the lower pot (8) is not more than 125° C. and is preferably between 40° C. and 60° C.

According to the present invention, the means (8) for evacuating the combustion gases (HBr) consist of a lower pot, in particular one made of sintered PVDF with an outer steel jacket.

This pot is equipped with a side outlet (7) for the gas produced and safety members such as a rupture disc (9) which is connected to a screen (fragment guard) (10).

According to the present invention, the combustion chamber is advantageously equipped with one or more inspection ports located closest to the flame.

These inspection ports may in particular allow visual control of the flame and the introduction of the lighting means.

Figure 3:
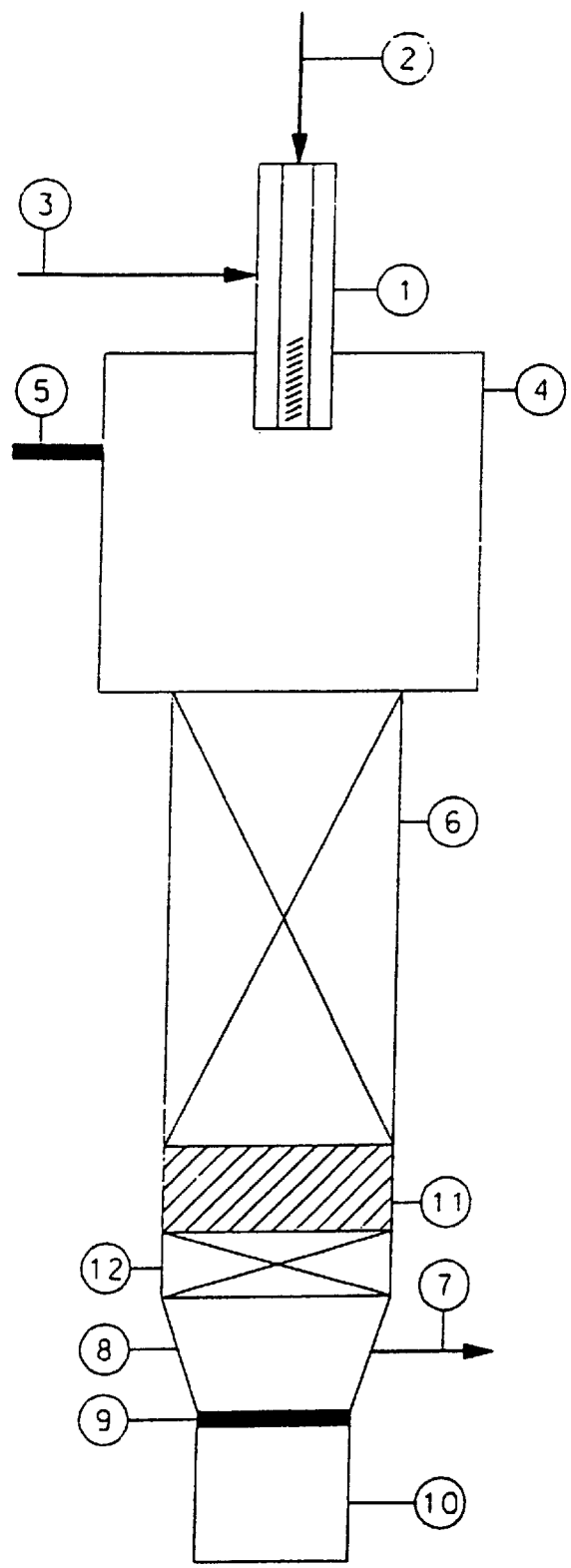

This process in accordance with the invention may also be carried out using a specific device as represented diagrammatically in FIG. 3.

In this device, a finishing stage (11) has been inserted between the cooling zone (6) and the pot (8).

This finishing stage consists of a steel jacket in which there is a catalytic charge such as active charcoal.

Water or a brine for cooling may circulate in the jacket.

According to this variant, the temperature of the gases entering this finishing stage may be between 150° C. and 200° C.

It would not constitute a departure from the scope of the invention if a cooling zone (12) comprising at least one impregnated graphite block was incorporated after the finishing stage (11).

This process in accordance with the invention is of great flexibility while at the same time ensuring good operational safety and good operability.

For a given size of the combustion chamber and of the cooling zone, the entry flow rates of the reactants may be varied within a wide range. This is allowed since the burner may be changed easily.

This process also has the advantage of leading to a very pure hydrogen bromide at a sufficient pressure, thereby allowing it to be used either as a reactant in organic synthesis or to prepare pure HBr solutions without using expensive recompression and purification means.

In addition, this process makes it possible to obtain bromine-free vent gases.

The example which follows illustrates the invention.

A generator as represented in FIG. 1 is used, comprising:
- a burner, consisting of a vertical quartz chamber inside which is a vertical tube as represented diagrammatically in FIG. 2,
- a combustion chamber of diameter equal to 250 mm consisting of Graphylor® type HB and of height equal to 1,200 mm.

This chamber is cooled with water to an inlet temperature equal to 28° C.,
- a cooling zone fitted with 5 blocks of graphite impregnated with Graphylor® type HB cooled by circulation of water,
- a pot (8) made of sintered PVDF,
- an evacuation line (7)
- a rupture disc (9) and a screen (10).

The generator is equipped with two diametrically opposite inspection ports, arranged on the walls of the combustion chamber in the bottom part of the burner.

The size of the items of equipment mentioned above have been determined in order to produce an amount of pure hydrogen bromide ranging from 1.4 to 9.6 tons per day.

The burner is fed with the following reactants:

hydrogen:
flow rate: 5 kg/h
pressure: 3 bar absolute temperature: 25° C.

air (oxidant):

flow rate: 30 kg/h pressure: 3 bar absolute temperature: 30° C.

A flame is started using a device (5) consisting of an $H_2$/air pilot burner which projects a flame via one of the 2 inspection ports.

Once the flame is started, the stream of air is replaced by a stream of bromine gas:

flow rate: 395 kg/h pressure: 3 bar temperature: 95° C.

water content: <0.01% chlorine content: <0.05%

The appearance of the flame may be observed via the inspection port. An adapted cell on one of the inspection ports makes it possible to reveal precisely the proportions of combustion reactants (colour of the flame) and thereby allows the flow rates to be adjusted.

The generator operates continuously, producing 400 kg/h of HBr gas including at least 399.9 kg of pure HBr leaving at (7) at 40° C. and at a pressure of 1.8 bar absolute. The hydrogen bromide obtained contains less than 50 mg of bromine per kg of HBr.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 09/08116, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the preparation of hydrogen bromide gas by direct combustion of bromine in hydrogen according to the reaction $H_2 + Br_2 \rightarrow 2HBR$, comprising conducting the following steps successively:

providing a vertically disposed tubular chamber surrounded by a concentric shell, wherein said tubular chamber having an upper part and a lower part with the lower part having lateral orifices around its periphery, mixing hydrogen and an oxidant by passing hydrogen into a concentric space formed by said shell and said chamber and passing said oxidant through the orifices outwardly and into the hydrogen within the concentric space, wherein the chamber is under a pressure greater than or equal to atmospheric pressure, starting a flame at an outlet of the said chamber, replacing all or part of the oxidant by a stream of prevapourized bromine, to provide a sufficiently homogeneous mixture comprising hydrogen, bromine and the oxidant, when present, with a sufficient $H_2/Br_2$ molar ratio to maintain a stable flame at the outlet of said chamber and in a combustion zone, so as to obtain complete combustion of the bromine in the hydrogen, cooling the combustion gases in a cooling zone, then recovering a flow of hydrogen bromide gas under a pressure at least equal to one bar absolute and at a temperature not above 125° C.

2. A process according to claim 1, wherein the oxidant is totally replaced by the stream of bromine.

3. A process according to claim 1, wherein the oxidant is partially replaced by the stream of bromine.

4. A process according to claim 1, wherein the oxidant is air.

5. A process according to claim 1, wherein the pressure in the chamber is at least equal to 1 bar absolute.

6. A process according to claim 1, wherein the $H_2/Br_2$ molar ratio is greater than 1 and less than 1.4.

7. A process according to claim 1, wherein the pressure prevailing in the cooling zone is at least equal to 1.3 bar absolute.

8. A process according to claim 1, wherein a stream of hydrogen bromide gas under a pressure of between 1.3 bar absolute and 10 bar absolute and at a temperature of between 40° C. and 125° C. is recovered.

9. A process according to claim 5, wherein the pressure in the chamber is greater than 1.3 bar absolute.

10. A process according to claim 5, wherein the pressure in the chamber is between 1.8 bar absolute and 10 bar absolute.

11. A process according to claim 7, wherein the pressure in the cooling zone is between 1.3 bar and 10 bar absolute.

12. A process according to claim 1 wherein the cooling of the hydrogen bromide formed starts from the moment of formation in the combustion zone and then continues in the cooling zone designed such that temperature falls gradually therein, and at the outlet of the cooling zone the temperature of the hydrogen bromide is between 40° C. and 125° C.

13. A process according to claim 12, wherein the oxidant is totally replaced by said stream of pre-vaporized bromine.

14. A process according to claim 12, wherein said orifices are diagonal slits.

15. A process according to claim 13, wherein the $H_2/Br_2$ molar ratio is greater than 1 and less than 1.4.

16. A process according to claim 14, wherein the pressure prevailing in the cooling zone is at least equal to 1.3 bar absolute.

17. A process according to claim 15, wherein the pressure in the chamber is between 1.8 bar absolute and 10 bar absolute.

18. A process according to claim 1, further comprising passing the flow of hydrogen bromide gas under pressure through a bed of activated charcoal.

19. A process according to claim 17, further comprising passing the flow of hydrogen bromide gas under pressure through a bed of activated charcoal.

* * * * *